United States Patent
Sims

(10) Patent No.: US 6,734,916 B1
(45) Date of Patent: May 11, 2004

(54) VIDEO FIELD ARTIFACT REMOVAL

(76) Inventor: Karl Sims, 8 Clinton St., Cambridge, MA (US) 02139

( * ) Notice: Subject to any disclaimer, the term of this patent is extended or adjusted under 35 U.S.C. 154(b) by 450 days.

(21) Appl. No.: 09/679,162

(22) Filed: Oct. 4, 2000

(51) Int. Cl.[7] ............... H04N 7/01; H04N 11/20
(52) U.S. Cl. ................... 348/452; 348/451
(58) Field of Search ............... 348/452, 551, 348/448, 458, 459

(56) References Cited

U.S. PATENT DOCUMENTS

| | | | | |
|---|---|---|---|---|
| 5,579,054 A | * | 11/1996 | Sezan et al. | 348/452 |
| 5,784,115 A | * | 7/1998 | Bozdagi | 348/452 |
| 6,262,773 B1 | * | 7/2001 | Westerman | 348/448 |

OTHER PUBLICATIONS

K.Sims, "Evolving Virtual Creatures", Computer Graphics (Siggraph '94 Proceedings), Jul. 1994, pp. 15–22.
K.Sims, "Evolving 3D Morphology and Behavior by Competition", Artificial Life IV Proceedings, ed.by Brooks & Maes, MIT Press, 1994, pp. 28–39.
K.Sims, "Artificial Evolution for Computer Graphics", Computer Graphics (Siggraph '91 proceedings), Jul. 1991, pp. 319–328.
K.Sims, "Interactive Evolution of Dynamical Systems", Towards a Practice of Autonomous Systems: Proceedings of the First European Conference on Artificial Life, MIT Press, 1992, pp. 171–178.
K.Sims, "Interactive Evolution of Equations for Procedural Models", The Visual Computer, Aug. 1993, pp. 466–476.
K.Sims, "Particle Animation and Rendering Using Data Parallel Computation", Computer Graphics (Siggraph '90 proceedings), Aug. 1990, pp. 405–413.
K.Sims, "Choreographed Image Flow", The Journal of Visualization and Computer Animation, vol. 3, 1992, pp. 31–43.
S.Smith, M.Bourgoin, K.Sims, & H. Voorhees, "Handwritten Character Classification Using Nearest Neighbor in Large Databases", Pattern Analysis and Machine Intelligence, Sep. 1994, pp. 915–919.

* cited by examiner

Primary Examiner—Michael H. Lee
(74) Attorney, Agent, or Firm—Fish & Richardson P.C.

(57) ABSTRACT

Portions that identify motion are identified in an original frame of interlaced video fields. A de-interlaced version of the frame is generated. The original frame and the de-interlaced frame are combined to form a resulting frame, the resulting frame including portions from the original frame that represent relatively less motion and portions from the de-interlaced version that represent relatively more motion.

7 Claims, 3 Drawing Sheets

(2 of 3 Drawing Sheet(s) Filed in Color)

VIDEO FIELD ARTIFACT REMOVAL

BACKGROUND

This invention relates to video field artifact removal.

The NTSC video standard represents moving pictures using 30 individual frames per second. Each frame consists of two separate fields, which are sampled at different points in time. One field is displayed as the even scan-lines of a frame, and the other field is displayed as the odd scan-lines of the frame. If video is displayed at the intended rate, this allows a balance in the tradeoff between smooth motion and image resolution quality. However, if a single frame of video is viewed as a still, or if the format or frame-rate is changed, such as when video material is copied to film, these field artifacts can become visible and are undesirable.

FIG. 1 shows an example of 3 frames of video material in which an object is moving over a stationary background. The fields are apparent in regions where the object is moving, because each field represents a different point in time and therefore has a different appearance with respect to a moving object. FIG. 1D shows a detail from FIG. 1B where the motion of a white object has generated visible field artifacts in the form of stripes.

Field artifacts can typically be removed by blurring the image vertically or averaging the scan-lines of one field to replace the other. These techniques can successfully eliminate field artifacts, but the effective resolution of the entire image is also reduced.

SUMMARY

The invention provides a process for adaptively removing field artifacts from digital video material. The process preserves the resolution quality of stationary areas of frames, while removing field artifacts where they exist.

Thus, in general, the invention features:

identifying, in an original frame of interlaced video fields, portions that represent motion in the frame, generating a de-interlaced version of the frame, and combining the original frame and the de-interlaced frame to form a resulting frame, the resulting frame including portions from the original frame that represent relatively less motion, and portions from the de-interlaced version that represent relatively more motion.

Implementations of the invention may include one or more of the following features: The portions of the fields and frames may be pixels. The portions that represent motion in the frame may be identified by comparing corresponding portions of at least two frames. The corresponding portions may be compared separately in different color channels. also including adjusting the results of the identifying step based on at least one of the following parameters: scale, threshold, or blur. Some portions of the de-interlaced version of the frame may be generated by a weighted averaging of portions of two fields of the frame. The de-interlaced frame may be generated in conjunction with a selected frame rate change.

Other advantages and features will become apparent from the following description and from the claims.

DESCRIPTION OF THE PROCEDURE

The claim of this patent contains at least one drawing executed in color.

Figure 4:
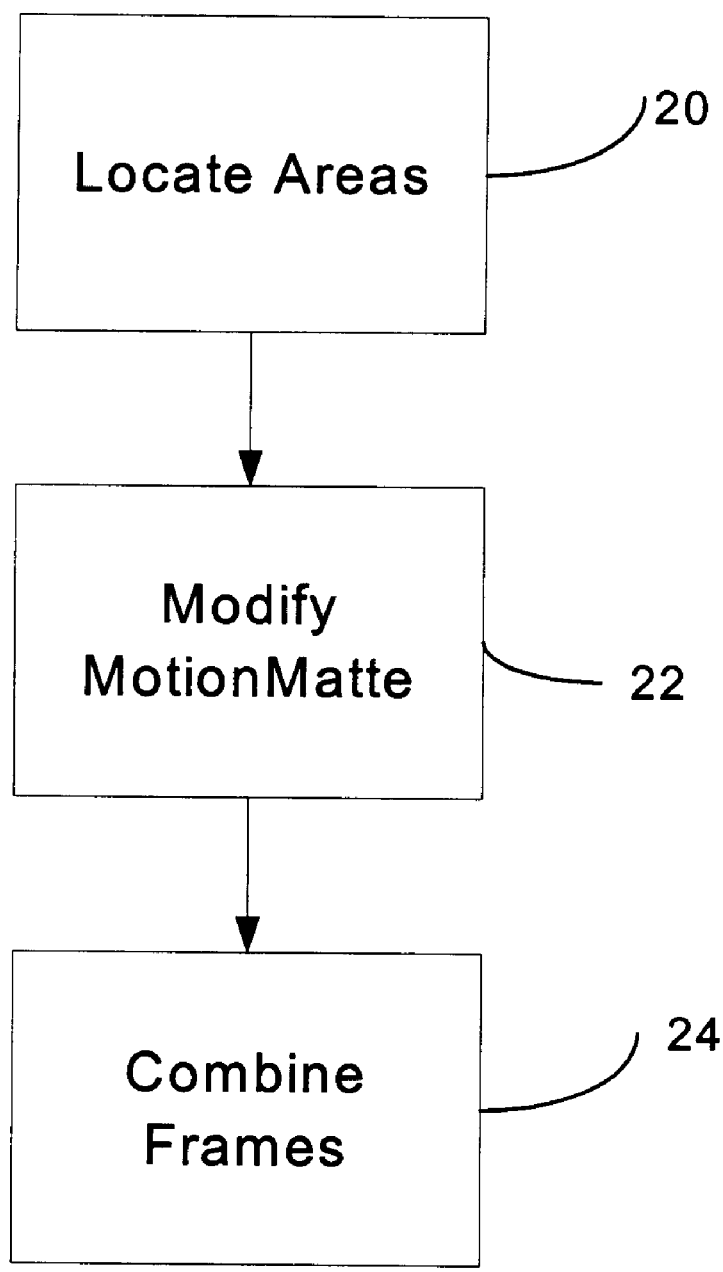
FIG. 4 shows a flow chart.

To adaptively remove field artifacts from a sequence of video frames, e.g., digital video frames, each frame in the sequence is processed as follows (see the flow chart in FIG. 4):

Step 1

Locate the areas of the frame that contain motion to generate a MotionMatte image 20. This is done by comparing the current frame with the previous and next frames in the clip. For example in FIG. 1, if B is the current frame, A would be the previous frame in time, and C would be the next frame in time. For each [x,y] pixel coordinate of the current frame, the corresponding pixel of the Motion Matte is determined by the following relationship:

$$\text{MotionMatte}[x,y] = \text{maximum}((abs(\text{Frame}[x,y]-\text{PrevFrame}[x,y]), (abs(\text{Frame}[x,y]-\text{NextFrame}[x,y]))$$

This is performed for the red, green, and blue channels independently, and then the maximum value of each pixel among the three channels is used to create a monochrome MotionMatte image.

The MotionMatte is then modified 22 using several parameters that can be adjusted if necessary by a user:

Scale Motion Matte: The MotionMatte is brightened overall by a given amount. A factor of 20 is typically used for this though other factors in the range of 1 to 100 may also be used. The effect of the scaling is to adjust the amount of field artifacts that are removed. The factor can be increased to remove more field artifacts or decreased to remove fewer and keep the image sharper.

Threshold Motion Matte: This value is subtracted from the Motion Matte and can be increased to reduce unwanted de-interlacing due just to noise. A value of 0.05 (or 5%) is typically used for this though other factors in the range 0 to 1 may also be used.

Blur Motion Matte: Determines how much the Motion Matte is smoothed out to avoid sharp transitions between the interlaced and de-interlaced areas. This value is typically set for a small amount of blur.

Finally the pixel values of the MotionMatte are clamped so none are below 0 (black) or above 1.0 (white).

Figures 1A, 1B, 1C:
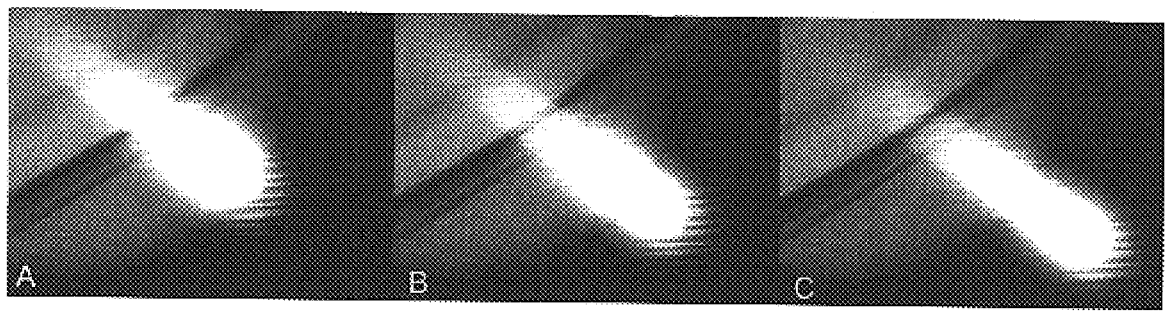
FIG. 1 shows a sequence of three video frames.
FIG. 1D illustrates detail of 1B showing field artifacts.
Figure 1D:
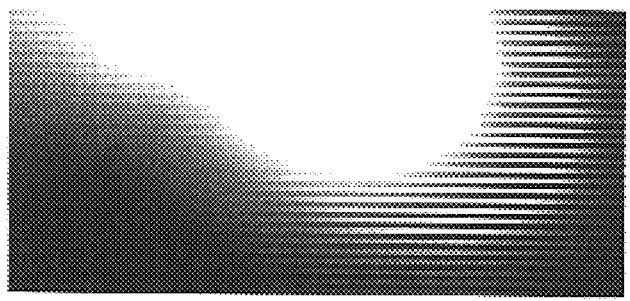
Figure 2:
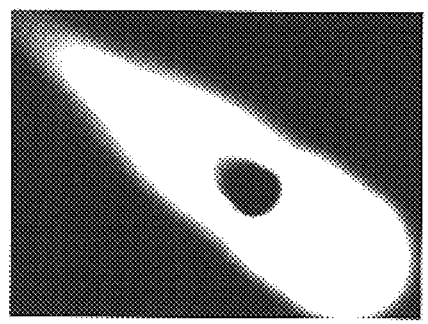
FIG. 2 shows a Motion Matte.

FIG. 2 shows a Motion Matte generated from the frame in FIG. 1B. It is white for the areas of motion, and black elsewhere.

Step 2

Create a de-interlaced version of the entire original frame. This can be done using one of three techniques:

A. The first field (even scan-lines) is kept and the second field (odd scan-lines) is removed. Each pixel in the field to be removed is replaced by the average of the pixel above and the pixel below (which belong to the remaining field).

B. The second field is kept and the first field is removed, using the analogous method as in A.

C. The two fields are de-interlaced and merged together. This is done by averaging the results of both A and B above.

Note that with any of these techniques alone, the resolution quality of the frame has been reduced due to the vertical averaging.

Step 3

The original frame, and the de-interlaced frame from Step 2 are combined 24 using the MotionMatte from Step 1, to give the result for that frame with the field artifacts removed. Pixels of the de-interlaced frame are used in the final frame in locations where the pixels of the MotionMatte are white (1.0). Pixels of the original frame are used where the MotionMatte is black (0). A weighted average of the two pixel values is used where the MotionMatte is gray. Thus, for each [x,y] pixel coordinate:

$$Result[x,y]=DeInterlaced[x,y]*MotionMatte[x,y]+Frame[x,y]*(1-MotionMatte[x,y])$$

Figure 3:
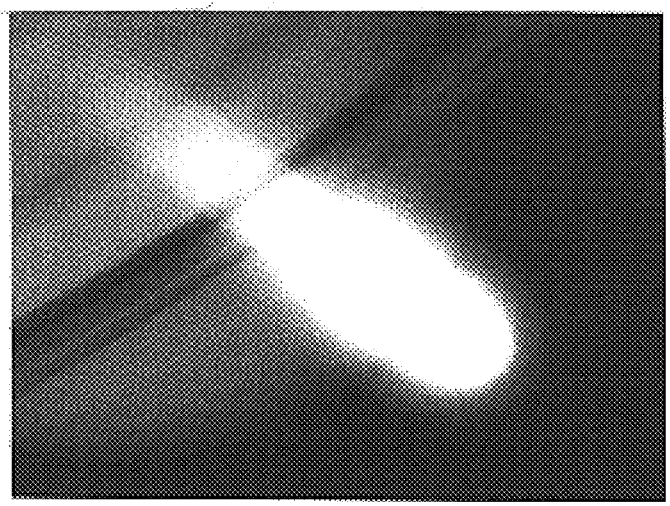
FIG. 3 shows a resulting frame.
Figure 3B:
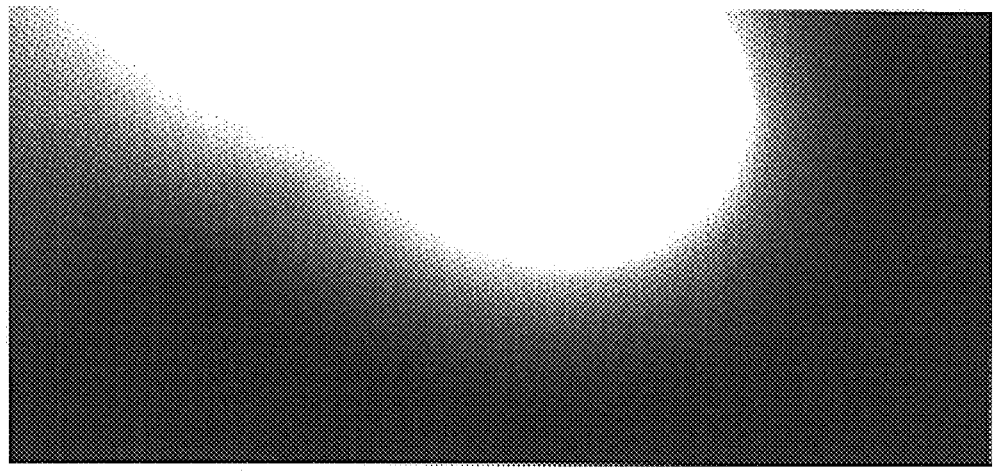
FIG. 3B shows detail of the resulting frame with no field artifacts.

FIG. 3 shows the final result of this process applied to the frame in FIG. 1B. The field artifacts are removed from the moving object, but the resolution quality of the stationary background has not been reduced.

Speed Change Options

This procedure may be combined with an optional frame-rate conversion process that automatically calculates which fields are kept for each frame while de-interlacing in Step 2 above.

If the user elects to generate a 'field-removed' result at half-speed, each original frame generates two resulting frames, the first keeping field1 and the second keeping field2 in the de-interlace step.

If the user wants to convert from 30 video frames per second to 24 'field-removed' frames per second, the procedure calculates the appropriate pattern of which fields to extract from each original frame to give the smoothest resulting motion, such as: 1st, 1st, 2nd, 2nd, none, etc.

User Interface

In addition to user interface elements that enable a user to set the scale, threshold, and blur values, the user interface can include two popup menus. One popup menu enables the user to choose an output option between "result", which outputs the de-interlaced result normally and: "MotionMatte", which allows viewing the MotionMatte, and can be helpful when adjusting the other parameters. The other pop-up menu enables the user to select which field to preserve in areas with field artifacts. The user may select either field or a merger of the two. An additional control enables the user to select changes to the frame-rate, such as "same speed", "half speed de-interlaced", or "NTSC to film" (30 fps to 24 fps).

Other embodiments are within then scope of the following claims.

What is claimed is:

1. A method comprising identifying portions of an original frame of interlaced video fields, the portions comprising pixels representing motion in the original frame, the portions representing motion being identified by comparing corresponding portions of at least two frames, generating a de-interlaced version of the original frame, and combining the original frame and the de-interlaced version to form a resulting frame, the resulting frame including portions from the original frame that represent relatively less motion, and portions from the de-interlaced version that represent relatively more motion.

2. The method of claim 1 in which the corresponding portions are compared separately in different color channels.

3. The method of claim 1 also including adjusting the results of the identifying step based on at least one of the following parameters: scale, threshold, or blur.

4. The method of claim 1 in which some portions of the de-interlaced version of the frame are generated by a weighted averaging of portions of two fields of the frame.

5. The method of claim 1 in which the de-interlaced frame is generated in conjunction with a selected frame rate change.

6. A method comprising identifying, in an original frame of interlaced video pixels, pixels that represent motion in the frame, by comparing corresponding pixels in different color channels of at least two frames, generating a de-interlaced version of the frame, combining the original frame and the de-interlaced frame to form a resulting frame, the resulting frame including pixels from the original frame that represent relatively less motion, pixels from the de-interlaced frame that represent relatively more motion, and pixels that are weighted averages of pixels in two fields of the frame.

7. Machine-readable code stored on a medium, the code being capable of configuring a machine to identify portions of an original frame of interlaced video fields, portions comprising pixels and representing motion in the original frame, the portions representing motion being identified by comparing corresponding portions of at least two frames, generate a de-interlaced version of the original frame, and combine the original frame and the de-interlaced version to form a resulting frame, the resulting frame including portions from the original frame that represent relatively less motion, and portions from the de-interlaced version that represent relatively more motion.

* * * * *